(12) United States Patent
Weber (10) Patent No.: US 12,025,093 B2
(45) Date of Patent: Jul. 2, 2024

(54) WIND TURBINE POWER TRANSMISSION SYSTEM

(71) Applicant: Vestas Wind Systems A/S, Aarhus N (DK)

(72) Inventor: Andreas Weber, Dortmund (DE)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/029,978

(22) PCT Filed: Jul. 23, 2021

(86) PCT No.: PCT/DK2021/050245
§ 371 (c)(1),
(2) Date: Apr. 3, 2023

(87) PCT Pub. No.: WO2022/073571
PCT Pub. Date: Apr. 14, 2022

(65) Prior Publication Data
US 2023/0366381 A1    Nov. 16, 2023

(30) Foreign Application Priority Data
Oct. 6, 2020  (DK) .......................... PA 2020 70677

(51) Int. Cl.
*F03D 15/10* (2016.01)
*F03D 80/70* (2016.01)
(Continued)

(52) U.S. Cl.
CPC .............. *F03D 15/10* (2016.05); *F03D 80/70* (2016.05); *H02K 7/116* (2013.01); *H02K 7/1838* (2013.01); *F05B 2260/4031* (2013.01)

(58) Field of Classification Search
CPC ......... F03D 15/10; F03D 80/70; H02K 7/116; H02K 7/1838; F05B 2260/4031
See application file for complete search history.

(56) References Cited

U.S. PATENT DOCUMENTS

| 8,256,327 B2 | 9/2012 | Schreiber |
| 2010/0077882 A1 | 4/2010 | Schreiber |

(Continued)

FOREIGN PATENT DOCUMENTS

| CH | 96719 A | 11/1922 |
| CN | 102597510 A | 7/2012 |

(Continued)

OTHER PUBLICATIONS

International Searching Authority, International Search Report and Written Opinion issued in corresponding PCT Application PCT/DK2021/050245, mailed Jan. 3, 2022.

(Continued)

*Primary Examiner* — Viet P Nguyen
(74) *Attorney, Agent, or Firm* — Wood Herron & Evans LLP (57) ABSTRACT

The invention relates to a wind turbine (2) comprising: a nacelle (8) provided on the top of a tower (12), a rotor including a hub (6) and a number of blades (4), a main shaft (16) configured to be driven by the rotor about a main axis and supported on the nacelle (8), a generator (28) having a generator rotor and generator stator, and a gear system (25) arranged to increase the rotational speed between said rotor and said generator rotor. The gear system (25) comprises: a fixed ring gear (50), an input member (53) coupled to or driven by the main shaft (16) having a plurality of radially movable tooth segments (52,63) carried in guiding slots and engageable at outer ends with the ring gear (50), a central output member (55) within the input member (53) having an outer eccentric profile acted on and driven by inner ends of radially movable tooth segments (52,63), whereby rotary movement of the input member (53) drives the radially movable tooth segments (52,63) through engagement with (Continued)

the ring gear (50) and effects rotation of the central output member (55).

22 Claims, 8 Drawing Sheets (51) Int. Cl.
*H02K 7/116* (2006.01)
*H02K 7/18* (2006.01)

(56) References Cited

U.S. PATENT DOCUMENTS

| | | |
|---|---|---|
| 2011/0175363 A1* | 7/2011 | Pischel .................. F03D 15/10 290/55 |
| 2013/0043683 A1 | 2/2013 | Genovese |

FOREIGN PATENT DOCUMENTS

| | | |
|---|---|---|
| DE | 102007016189 A1 | 10/2008 |
| EP | 3354934 A1 | 8/2018 |
| WO | 03031811 A2 | 4/2003 |
| WO | 2009091261 A2 | 7/2009 |

OTHER PUBLICATIONS

Danish Patent and Trademark Office, Examination Report issued in corresponding Danish Application No. PA 2020 70677, Mar. 19, 2021.

* cited by examiner

WIND TURBINE POWER TRANSMISSION SYSTEM

FIELD OF THE INVENTION

The present invention relates to power transmission systems for wind turbines. More specifically, the present invention relates to wind turbines comprising a new type of gearbox.

BACKGROUND OF THE INVENTION

Wind turbines typically include a rotor with large blades driven by the wind. The blades convert the kinetic energy of the wind into rotational mechanical energy. The mechanical energy usually drives one or more generators to produce electrical power. Thus, wind turbines include a power transmission system to process and convert the rotational mechanical energy into electrical energy. The power transmission system is sometimes referred to as the "power train" of the wind turbine. The portion of a power transmission system from the rotor to the generator is referred to as the drivetrain.

Oftentimes it is necessary to increase the rotational speed of the rotor to the speed required by the generator(s). This is accomplished by a gearbox between the rotor and generator. Thus, the gearbox forms part of the power train and converts a low-speed, high-torque input from the rotor into a lower-torque, higher-speed output for the generator. Wind turbines with medium or high speed generators usually utilize gearboxes providing gear ratios between i=30 and i=140, requiring gearboxes with two or three gear stages, which may be epicyclical gear states alone or in combination with parallel gear stages. These gears come with a certain VOC (=volume of control, i.e. how much volume is used), weight, thus costs and a given efficiency. It is desired to find alternative types of gearboxes where a higher gear ratio per VOC/weight can be achieved in the high torque domain of modern wind turbine technology.

U.S. Pat. Nos. 8,656,809B2 and 8,256,327B2 disclose an alternative type of gear system including radially moving teeth and building further on technology from e.g. WO99/36711, both utilised to reduce a high electrical motor speed down to the low speed needed for e.g. a tool machine function (step-down). For ease of reference, the technology as described in U.S. Pat. Nos. 8,656,809B2 and 8,256,327B2 will hereafter be referred to radial-moving-teeth design.

With this radial-moving-teeth design, intuitively it is expected to only be operable as step-down gearing, in similar way to a worm drive. Indeed, the disclosure of U.S. Pat. No. 8,656,809B2 is as a step-down gear, where it is mentioned that with the radial-moving-teeth design it is possible to freely select a very high drive-input-side rotational speed range up to approximately 6000 rpm, and further that it is possible to freely select transmission ratios of approximately i=10 to i=200.

With the present invention the inventor has realized that the radial-moving-teeth design technology can be used for step-up gearing as well and that it is particularly advantageous in gearboxes for wind turbines to obtain compact wind turbine transmission systems.

SUMMARY OF THE INVENTION

The invention relates to a wind turbine comprising: a nacelle provided on the top of a tower, a rotor including a hub and a number of blades, a main shaft configured to be driven by the rotor about a main axis and supported on the nacelle, a generator having a generator rotor and generator stator, and a gear system arranged to increase the rotational speed between said rotor and said generator rotor. The gear system comprises: a fixed ring gear, an input member coupled to or driven by the main shaft having a plurality of radially movable tooth segments carried in guiding slots and engageable at outer ends with the ring gear, a central output member within the input member having an outer eccentric profile acted on and driven by inner ends of radially movable tooth segments, whereby rotary movement of the input member drives the radially movable tooth segments through engagement with the ring gear and effects rotation of the central output member.

The radial-moving-teeth design introduces new basic principles compared to traditional gears used in wind turbines. Instead of rotating gears, a large number of single tooth segments is used to connect between input and output, ensuring a multiple utilisation of each tooth segment during one rotation around the centre. This provides a gear system that can handle gear ratios between 10 and around 100 in one stage with a particularly high power density and stiffness. Furthermore, the gear system is very compact with an excellent power-to-size ratio.

A key point in the use of the radial-moving-teeth design in machine tools in the power range of a few kW is that the system comes without backlash. For machine tools and robotics, extremely precise positioning is required which does not allow any backlash, and furthermore backlash may be damaging due to potential vibrations.

With the present invention, the inventor has discovered that on the contrary, for a purpose in wind turbines in MW class, the loading of the gears is much more controlled, and the gears will never, in operational mode, be in contact with reverse flanks. Therefore, in wind turbines, backlash is advantageously introduced by taking back the non-load tooth flank and thereby finetuning to optimize efficiency.

Compared to a typical wind turbine gearbox comprising traditional gears, to get the same ratio with the radial-moving-teeth design system, significant savings in VOC may be seen. In general, considering power density and VOC tremendous advantages have been seen. As the interior parts are made of standard steels as usually used in gearboxes together with standard hardening processes, the costs per kg will be similar to today's gearboxes, at least after rolling out the technology.

An additional feature highly advantageous for the use in wind turbines is that the radial-moving-teeth design offers unique possibilities to drive scalability i.a. by:
1. for given torque reducing outer diameter by providing multiple rows of tooth segments
2. Scaling torque by number of tooth segments
3. Scaling torque by number of tooth rows An additional feature highly advantageous for the use in wind turbines is that the radial-moving-teeth design exhibits beneficial noise and vibration characteristics.

In preferred embodiments of the invention, said input member is an annular input member, i.e. a generally ring-shaped member. Further, the tooth segments are mounted such that they can be displaced radially outwards and inwards within guiding slots in the input member.

In an embodiment of the invention, each radially movable tooth segment is connected to a tilting pad through a flexible connection, preferably a cylindrical-joint-like connection; said tilting pad being adapted for sliding along said output member. In other embodiments, a ball-joint-like connection may also be applicable.

In an embodiment of the invention, the output member is generally circular in cross-section with at least one eccentricity, preferably at least two eccentricities. In various embodiments, the output member has at least one eccentricity on which the radially movable tooth segments act when the radially movable tooth segments are moved into corresponding toothings in the ring gear when rotation of the input member occurs in order to transmit torques and to set a selectable transmission ratio. In various embodiments, the number of eccentricities can be at least two or at least three, even at least four. Hereby it is possible to set or vary a transmission ratio. This transmission ratio may also be adjustable by means of different number of tooth segments and different number of internal toothings of the ring gear.

In an embodiment of the invention, said output member is coupled to at least one further gear stage, such as one parallel gear stage. The present invention allows for the new gear system to stand alone as the full gearbox or to be coupled together with well-known gear stages, such as planetary gear stages or parallel gear stages. Any combination of such are also within the scope of the present invention.

In an embodiment of the invention, backlash is allowed between the non-loaded flank and the rear flank of the ring gear. In already known systems using the radial-moving-teeth design, precision is essential, and no backlash is allowed. In wind turbines, this is not the case which may allow for simpler and longer-lasting designs. This backlash may e.g. be at least 0.5 mm along the circumferential direction, such as at least 1 mm.

In an embodiment of the invention, said gear system has a speed-increasing transmission ratio between i=10 and i=150, preferably between i=20 and i=75, such as between 25 and 50.

In an embodiment of the invention, said gear system has a number of radially movable tooth segments between 10 and 200, preferably between 40 and 100.

In an embodiment of the invention, said gear system has at least two rows of radially movable tooth segments, such as at least three rows. In various embodiments, the number of rows could be one single, as shown in the figures, but also 2, 3, 4 or 5 may have find a huge benefit in enabling flexibility to use same elements with various torque levels. In some embodiments, the number of radially movable tooth segments per row is between 12 and 60.

In an embodiment of the invention, the diameter of said ring gear is between 1000 mm and 3500 mm, preferably between 1500 mm and 2500 mm.

In an embodiment of the invention, said movable tooth segments are cylindrical with a diameter of between 10 and 20 cm, and with a length between 20 and 50 cm. Needless to say, the dimensions involved within wind are much higher than for tooling. In tooling a typical tooth segment diameter is max 2 cm with a length of max 5 cm.

In an embodiment of the invention, an outer tooth flank contour of a tooth flank of the tooth segments and/or a flank contour of a toothing of an internal toothing of said ring gear have/has, in relation to a gear set axis, a tooth contour which makes surface contact possible in an engagement region, wherein the surface contact is achieved by the design as a logarithmic spiral. A benefit of the radial-moving-teeth design is that they do not utilize the involute tooth flank as normally used, but instead a flank contour following a logarithmic spiral. Hereby a larger surface contact can be achieved in the engagement regions.

In an embodiment of the invention, regardless of a selected radius of the gear set axis (M), the outer tooth flank contour of the flank region of the tooth segment and the flank contour of the internal toothing system of the toothing system of the ring gear correspond to a common logarithmic spiral (Ln) with a pitch angle ($\alpha$).

In an embodiment of the invention, during the stroke movement of the tooth segments, there is a uniform load distribution, as the tooth segments are displaced along the logarithmic spiral (Ln) and those tooth flanks of the tooth segments and the ring gear internal toothing which are in contact with one another always have the same pitch angle ($\alpha$).

In an embodiment of the invention, the pitch angle ($\alpha$) is between 15° and 75°, such as between 20° and 40°. In other embodiments, ($\alpha$) may be between 30° and 60°.

In an embodiment of the invention, the tooth segments have a tip curve, which bear tangentially against the tooth flank and merges into the outer tooth flank contour thereof.

In an embodiment of the invention, a ring gear root fillet is provided between the respective flank contours of the internal toothing of the ring gear, wherein the ring gear root fillet is less curved than a tip curve of the tooth segments.

In an embodiment of the invention, a coating is used in at least one of the following interfaces: tooth segment to ring gear, tooth segment to input member, and tilting pad to output member. Friction loss may be lowered through the use of a coating in appropriate contact surfaces.

In an embodiment of the invention, said wind turbine (2) has a nominal power of at least 2 MW, such as at least 4 MW.

In an embodiment of the invention, said wind turbine further comprises:
  a support structure including at least one bearing supporting the main shaft for rotation about the main axis and constraining other movements;
  wherein said gear system has a gearbox housing rigidly coupled to the support structure.

In an embodiment of the invention, the support structure further includes a bearing housing surrounding the at least one bearing, the gearbox housing being suspended from said bearing housing.

As mentioned, a generator is connected to said output member. A generator has a generator rotor and a generator stator within a generator housing, and in preferred embodiments, the generator housing is rigidly coupled to and suspended from the gearbox housing, but in other embodiments, the generator housing could instead be positioned adjacent the gearbox with said generator rotor being connected to said output member.

In an embodiment of the invention, the at least one bearing comprises a first bearing and a second bearing spaced apart within the bearing housing.

In an embodiment of the invention, said ring gear is integrated with or rigidly coupled to said bearing housing and said input member is integrated with or rigidly coupled to said main shaft.

In an embodiment of the invention, said gear system is fully integrated within said bearing housing such that said ring gear, along the rotational axis of the main shaft, is positioned between said first bearing and said second bearing.

Even though the present gear system is very compact in itself, an even more compact solution may be obtained through fully integrating the gear system into the bearing housing. In such a solution, a generator could be positioned directly behind the bearing housing.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

DETAILED DESCRIPTION OF THE DRAWINGS

Figure 1:
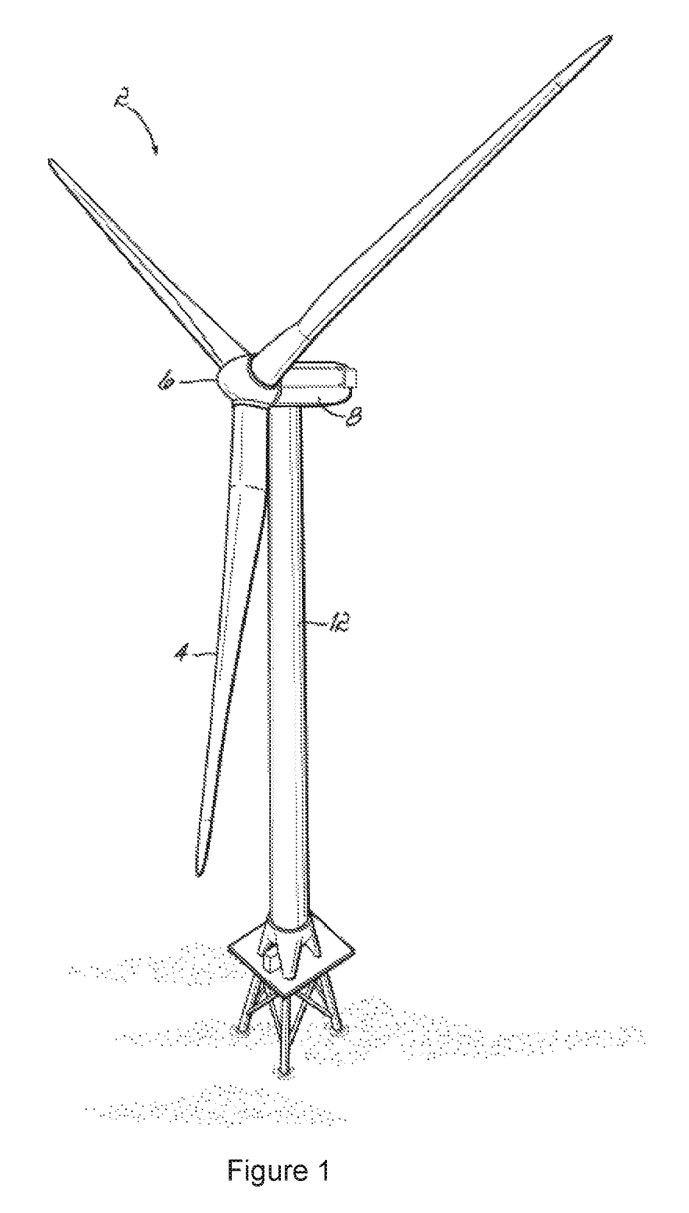
FIG. 1 is a perspective view of one example of a wind turbine.
Figure 2:
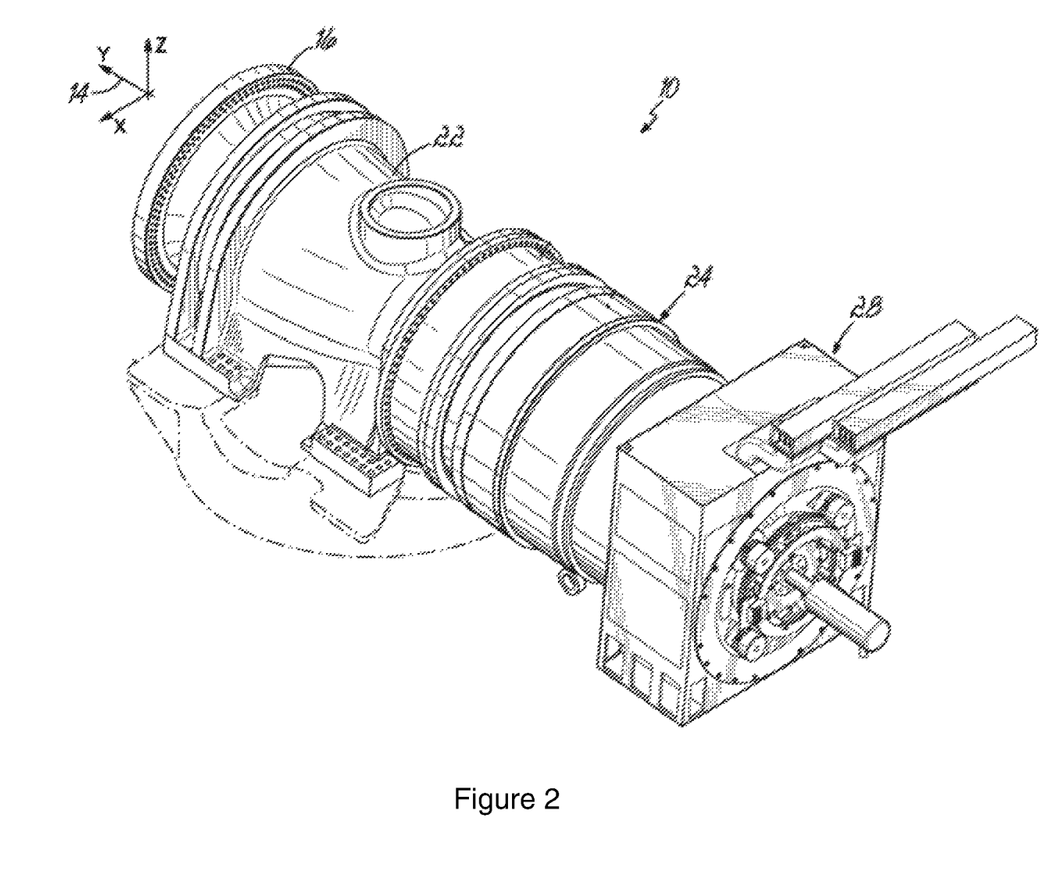
FIG. 2 is a perspective view of a power transmission system for the wind turbine of FIG. 1.

FIG. 1 shows one example of a wind turbine 2. Although an offshore wind turbine is shown, it should be noted that the description below may be applicable to other types of wind turbines as well. The wind turbine 2 includes a rotor including blades 4 mounted to a hub 6, which is supported by a nacelle 8 on a tower 12. Wind causes the rotor (blades 4 and hub 6) to rotate about a main axis 14 (FIG. 2). This rotational energy is delivered to a power transmission system (or "power train") 10 housed within the nacelle 8.

Figure 3:
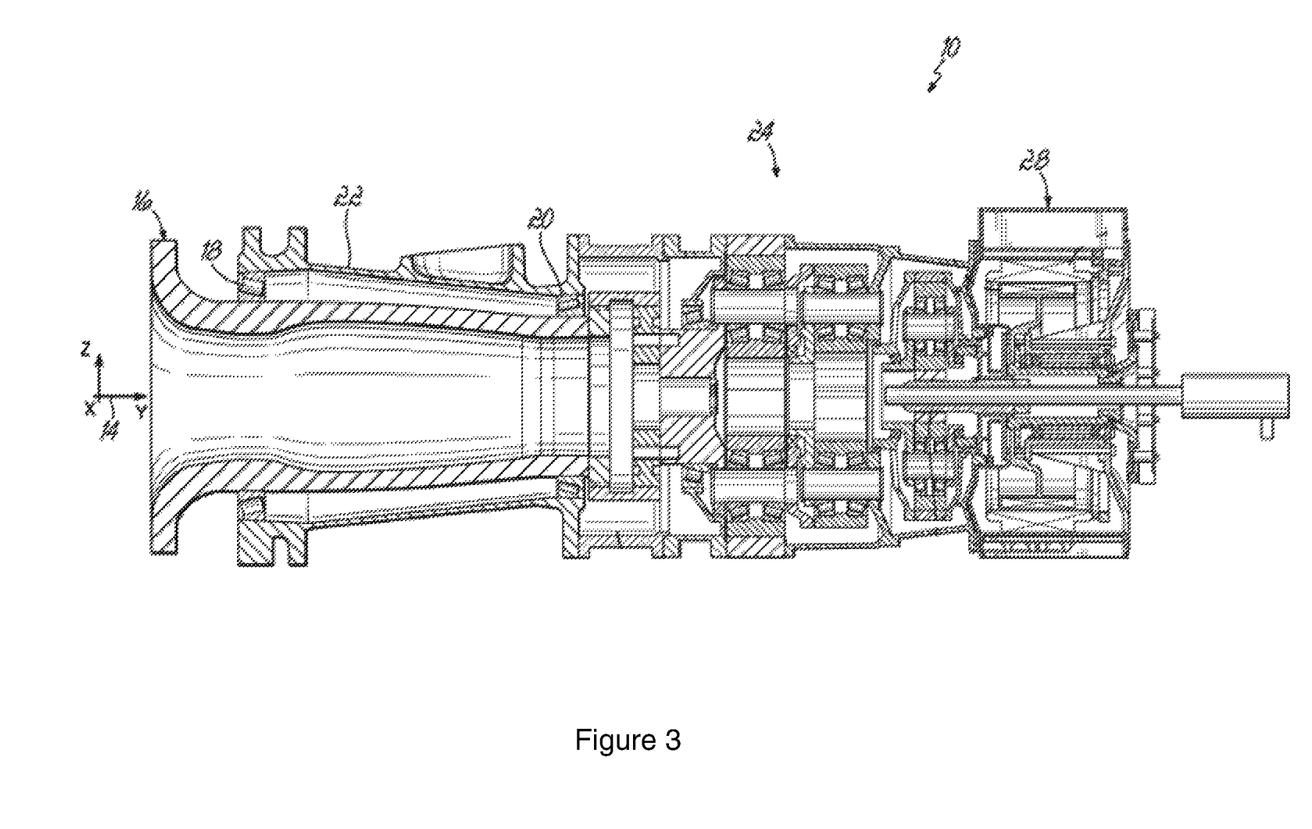
FIG. 3 is a cross-sectional view of the power transmission system of FIG. 2.

FIGS. 2 and 3 shows a prior art power transmission system 10 including a main shaft 16 coupled to the hub 6 (FIG. 1). The power transmission system 10 also includes first and second bearings 18, 20 supporting the main shaft 16, a bearing housing 22 surrounding the first and second bearings 18, 20, and a gearbox 24 having an input member driven by the main shaft 16. The gearbox 24 increases the rotational speed between the main shaft 16 and the generator 28. It should be noted that the elements shown in FIGS. 1-3, such as rotor, hub 6, main shaft 16, and nacelle 8 are shown as examples only, and these may vary in design within the scope of the present invention.

The type of input member depends on the particular gearbox design. Shown in FIG. 3 is a prior art gearbox with the use of a planet carrier of the first planetary stage, wherein the ring gear is fixed to the housing, which results in the sun gear increasing the rotational speed to transfer to the next stage of the gearbox.

Figure 4:
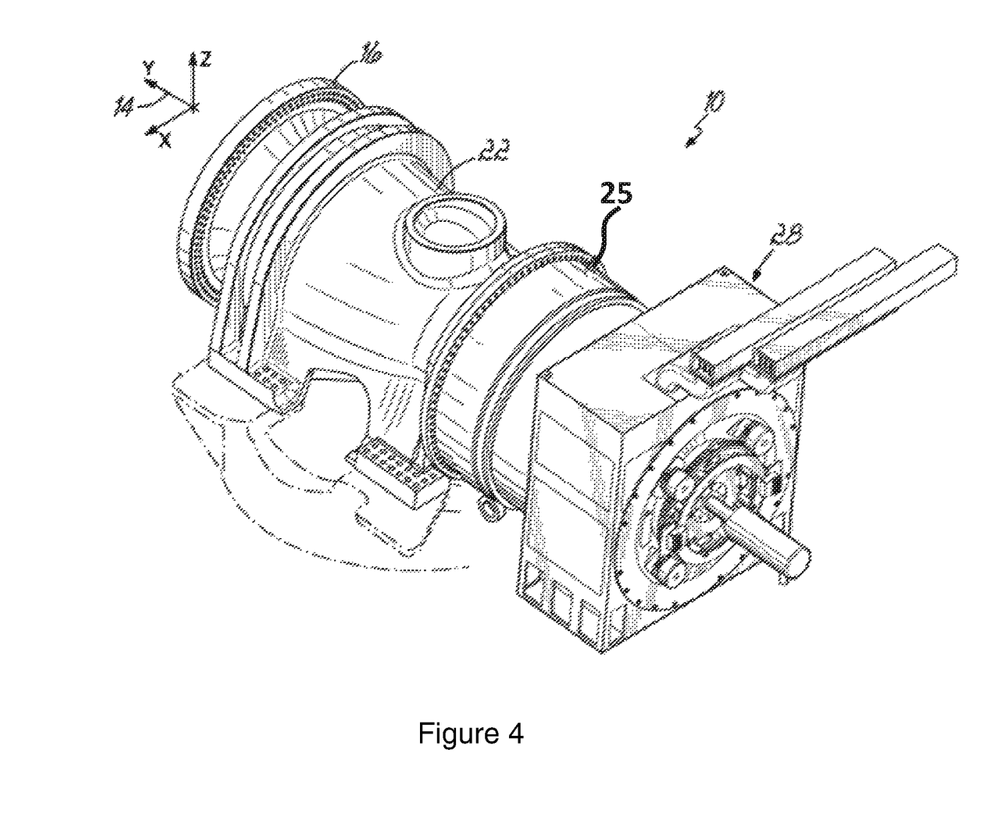
FIG. 4 is a perspective view of a power transmission system according to an embodiment of the present invention.

FIG. 4 shows a power transmission system 10 similar to the prior art system in FIG. 2, but now with the prior art gearbox 24 replaced with a gear system 25 according to the present invention including the radial-moving-teeth design gear. It is noted that the other components of the power transmission system are identical, namely the generator 28 and the bearing housing 22 including the main shaft 16. It is noted that in spite of the much lower axial width of the new gear system compared to the prior art gearbox, the transmission ratio of the gearboxes of FIGS. 2 and 4 are comparable. Thus, it is even visually clear that the new gearbox including radial-moving-teeth design gears provides a huge saving in volume and consequently also weight of the gearbox as compared to traditional gearboxes in wind turbines.

The fundamental functionality of the radial-moving-teeth design gear is described in detail in U.S. Pat. Nos. 8,656,809B2 and 8,256,327B2 and reference is made to these documents with respect to additional details in the method of operation of the radial-moving-teeth design gear.

Figure 5:
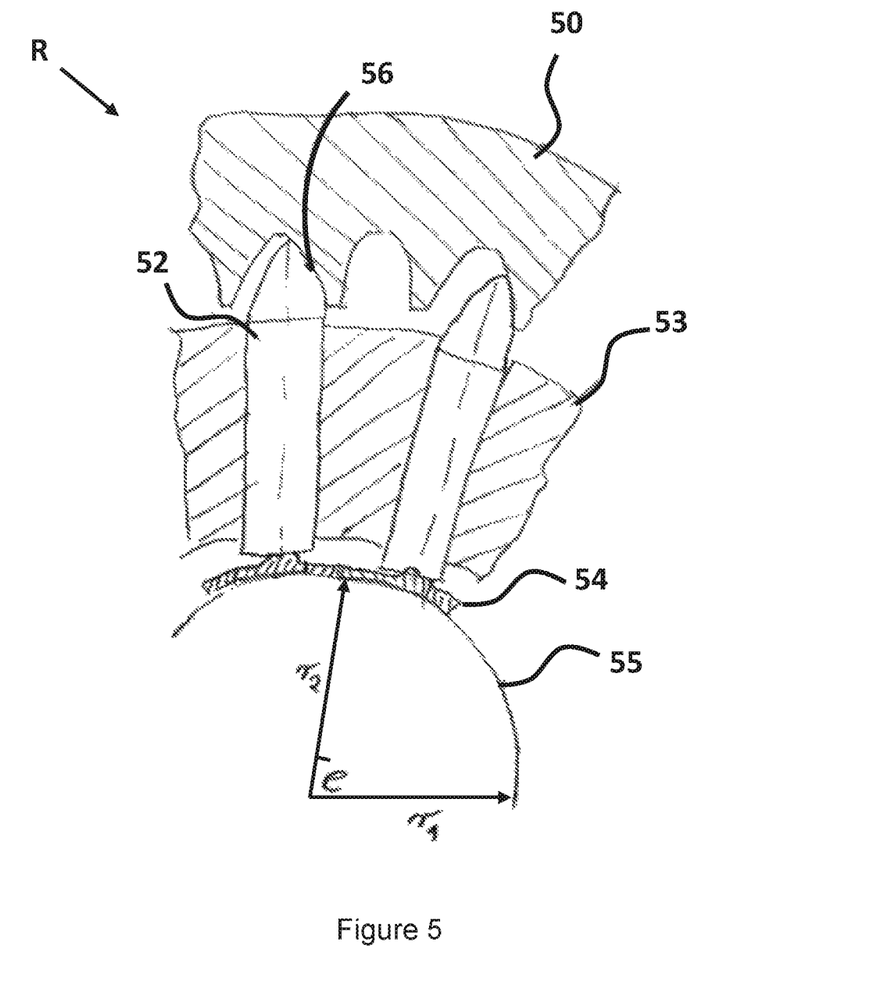
FIG. 5 is a schematically illustrated cross section through a part of a gearing according to an embodiment of the present invention.

FIG. 5 shows a part of a coaxial gear set R with a radial-moving-teeth design gear and will now be described in the context of an embodiment of the invention in which the radial-moving-teeth design gear is used to increase the relative rotational speed between the hub 6 and the generator rotor.

The ring gear 50 is a fixed part and is a component fixed to or formed as part of the gearbox housing. Its tooth segments are equipped with flanks following a logarithmic spiral 56. A number of identical, cylinder-shaped tooth segments 52, likewise equipped with flanks following a logarithmic spiral, are taken up by the tooth carrier 53, here acting as input member. Further, the tooth segments 52 are mounted such that they can be displaced radially outwards and inwards within guiding slots in the tooth carrier 53.

The tooth carrier 53 represents the input shaft and is physically connected to and rotates with the same rotational speed as the main shaft 16. The tooth segments 52 are all resting on identical tilting pads 54 which are guided by an eccentric shaft 55. This shaft, which may also be labelled a cam shaft, has a basic diameter of r1 and one or more eccentricities of e, so that the eccentric maximum r2 is r1+e.

A sliding bearing is provided between the outer contour of the eccentric shaft 55 and the tilting pads 54. The rotating carrier 53 drives the tooth segments 52 and the tooth segments 52 thereby the eccentric shaft 55, here acting as the output member, rotating with an increased speed as compared to the carrier 53. The direction of rotation between the carrier 53 and the output shaft 55 may be the same or the opposite, depending on the design parameters used.

The tilting pads ensure that the force from a radially inward motion of a tooth segment is distributed over a larger area on the output shaft. The tilting pads are tiltable to follow the eccentricity of the output shaft in all rotational positions of the output shaft. The tilting pads each feature a cylinder thereby creating a cylindrical-joint-like connection to each separate tooth segment with a corresponding indentation in the radially innermost part of the tooth segment. Further, the tilting pads have a sliding surface touching the output shaft. The sliding surface on the tilting pad may be realised by a coating or a layer with a material with a low friction coefficient on the tilting pad. Alternatively, a specific separate sliding pad may be attached to the tilting pad. Alternatively, the complete tilting pad may be manufactured from a material with a low friction coefficient.

In some embodiments, the tilting pads are connected to each other establishing a ring structure, whereas in other embodiments they are simply positioned next to each other, thereby filling out the full circumference of the output shaft.

Figure 6:
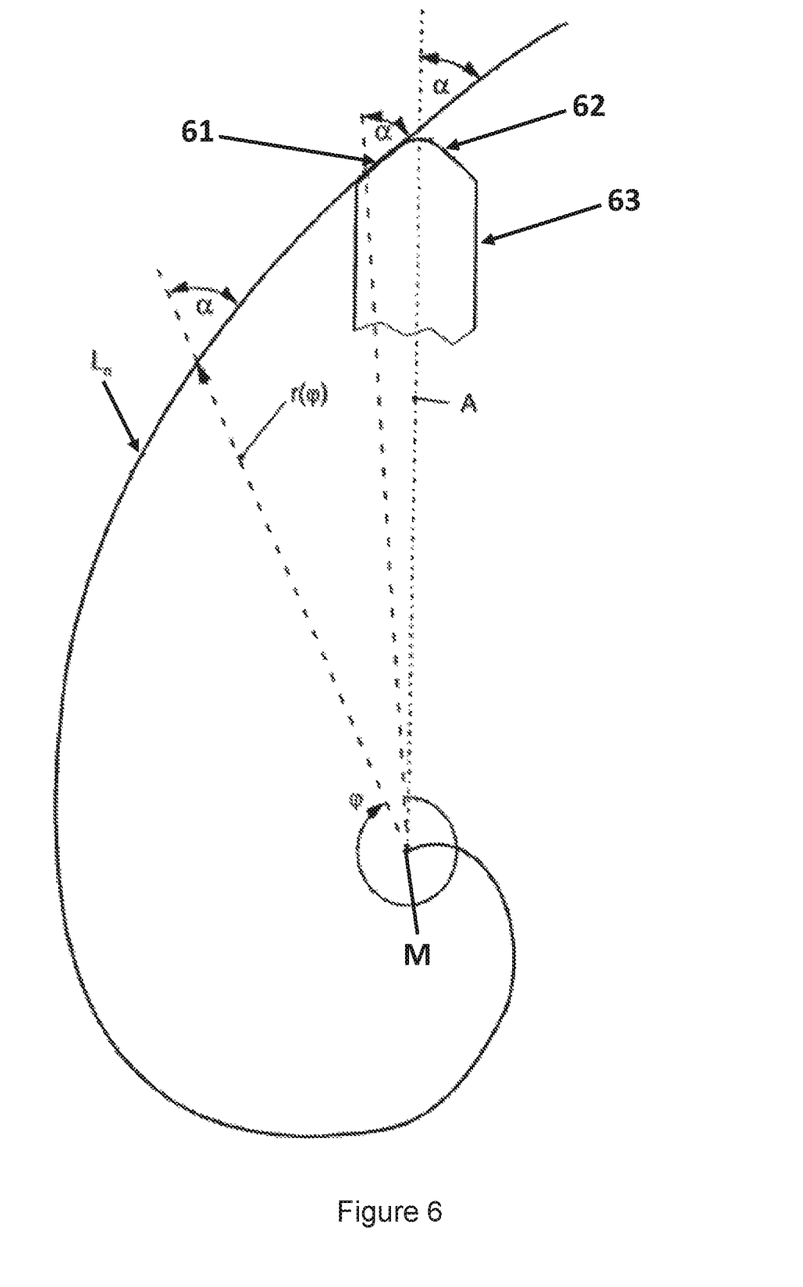
FIG. 6 shows a diagrammatically illustrated plan view of an embodiment of a contour of a tooth flank and an internal toothing system of a ring gear.
Figure 7:
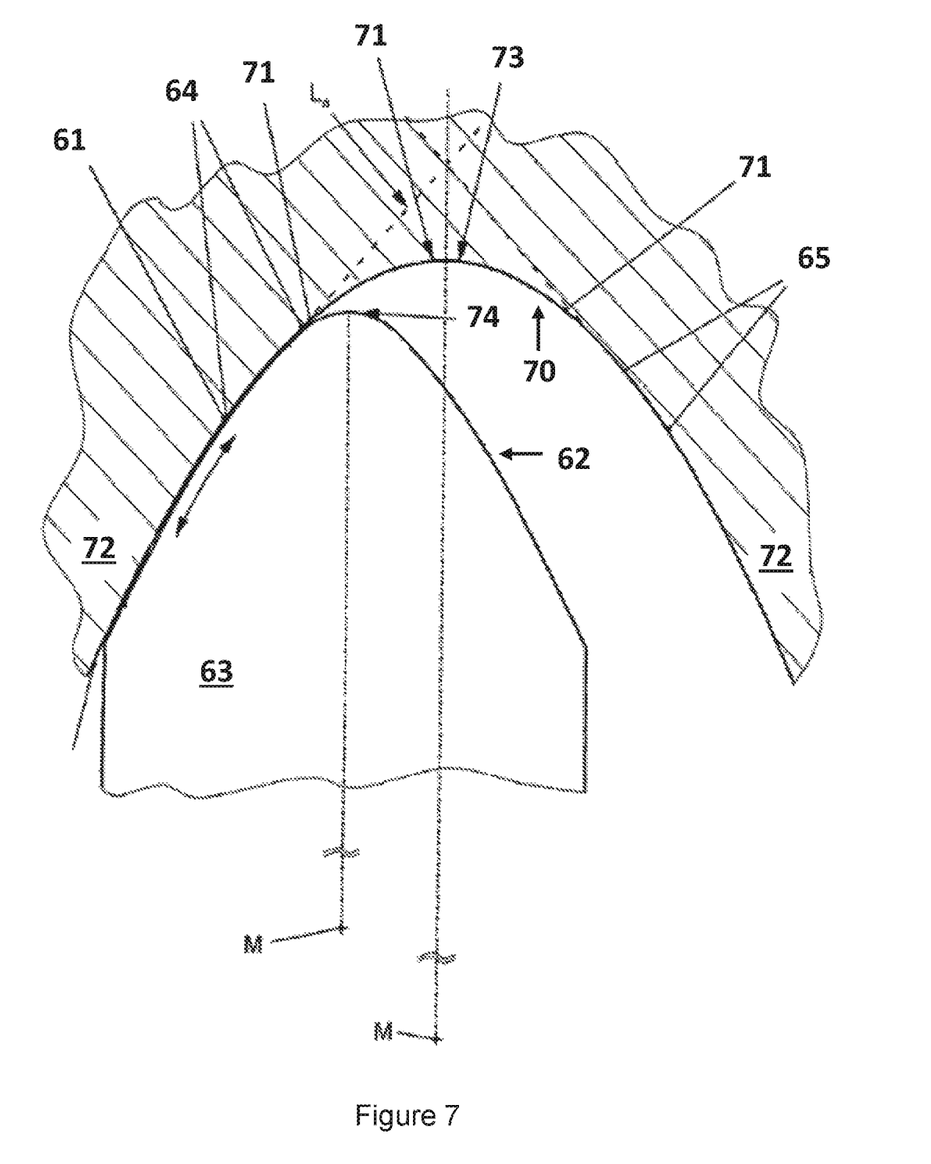
FIG. 7 shows a diagrammatically illustrated enlarged detail in the tooth region of FIG. 6.

FIGS. 6 and 7 give diagrammatic illustrations of a logarithmic spiral Ln which originates from a gear set axis M of a coaxial gear set R. The logarithmic spiral Ln can have any desired pitch angle α.

An outer tooth flank contour 61, 62 of the tooth segments 63 and an inner tooth flank contour 64 and 65 of the inner toothing 70 are preferably adapted to the contour or the course of the logarithmic spiral Ln as a function of a constant pitch angle α. Here is shown that both tooth flank contours 61, 62 and 64, 65 are mirror symmetrical with respect to a center axis A.

However, this needs not be the case for wind turbines, where the gearbox need not be able to move in both directions.

Independently of the selected radius r, each radii, starting from the gear set axis M of the coaxial gear set R, intersects the tooth flank contour 61 or 62 and 64 or 65 at an identical pitch angle α. The pitch angle α can be selected freely or is defined by the function of the selected logarithmic spiral Ln.

The displacement of the tooth segments 63 along the logarithmic spiral Ln with their tooth flanks 61 and 62 with respect to the tooth flanks 64 and 65, respectively, of the internal toothing 70, results in flank regions of the same pitch angle α always being opposite each other. As a consequence, a very good tooth face contact is always present.

This results in that no linear rolling takes place as in standard gears, but instead a flat displacement between the tooth segment 63 and the internal toothing 70 of the ring gear 50, which provides very high torque transmission with smaller wear than in standard gears.

Moreover, a ring gear root fillet 71, adapted tangentially with a contour to the contour 64 and 65 of the ring gear 50, is formed between two adjacent toothing systems 72 in the region of the tooth root 73 of the internal toothing 70.

The curvature here is preferably less than a tip curve 74 of the tooth segment 63. The tip curve 74 of the tooth segment 63 is adapted in a tangentially merging manner to the tooth flank contours 61, 62 of the tooth flanks. Hereby a transition with low jolt is ensured between the individual up and down movements of the tooth segments 63.

The contact area is sought to be as large as possible to transmit the largest possible forces and moments, especially in the region of a toothing system 72 of the ring gear 50. Additionally, because of the stroke movement of the tooth segments 63 with low jolt, pushing back of the tooth segments 63 takes place automatically as a result of the design of the tooth flank contour.

A preferred part of the invention is that an outer contour of tooth segments, in particular in the region of the tooth flanks, follows the contour of a logarithmic spiral. The logarithmic spiral denotes a curve which intersects all the radii emanating from the origin at the same pitch angle α. Its course is defined by the formula r=e^aα, where: tan α=1/a and a is a real constant, a>0.

This pitch angle α can be selected as desired between 15° and 75°, such as between 30° and 60°, by the corresponding function of the logarithmic spiral, with the result that different tooth flank geometries of the internal toothing system and of the tooth segments can also be influenced. In other embodiments, the pitch angle α can be selected as desired between 15° and 45°, such as between 20° and 40° or between 25° and 35°.

This contour is also used as the contour of a toothing system, in particular an internal toothing system of the ring gear. Hereby a full surface contact between one tooth flank contour of the tooth segment and the tooth flank contour of the toothing system is achieved in the engagement region of both tooth flanks of the tooth segment with the toothing system of the ring gear.

The logarithmic spiral geometry ensures full surface contact during the radial movement of the tooth segment into the internal toothing system of the ring gear, independently of radius and size of the gear. Further an optimum load distribution (pressure distribution) is obtained, with the result that a very good transmission of high torque may be possible. Furthermore, the wear may be lower than traditional wind turbine gearboxes, and not least the resulting wear will be uniform to the flank surfaces. This may result in a longer lifetime and less service needed, which is of very high importance in wind turbine industry, where downtime should be avoided as much as possible.

Provided that there are z2=80 tooth segments on the ring gear and the centre shaft features z1=two eccentric maxima the gearing ratio between the carrier 53 and shaft 55 calculates to $$i_{System} = \frac{z2}{z1} = \frac{80}{2} = 40$$

Each tooth segment 52 has a line contact with the internal toothing system of the ring gear (see FIG. 7) that due to the flank contour following a logarithmic spiral develops as a full hydrodynamic contact, i.e. surface contact is used instead of linear contact. There is no rolling contact as known from involute gears. Each tooth segment can align contact to the ring gear around its own axis due to the cylindrical shape of the tooth segment and the tilting pad. Thereby an ideal load distribution factor can be reached, similarly to Khβ=1.0 in an involute gear, where the usual value is around 1.15.

It is to be noted that the short lever of the forces between the heads of the tooth segments 52 and the supporting tooth carrier 53 is one reason for the extreme stiffness of this gear design, which provides a positive effect on the dynamics of a wind turbine.

In preferred embodiments, the output member 55 is arranged radially within and coaxially with the tooth carrier 53 forming the input member.

The desired transmission ratio can be chosen by means of the selection of a different number of tooth segments in relation to the toothings of the ring gear 50 or the output member 55, in particular also by means of the selection of an outer contour of the output member 55. It is possible to select or set the transmission ratio in particular by means of the selection of the different tooth engagements or by means of the different number of engagements of the tooth segments.

In the figures shown above, only one row of tooth segments are used in the system. However, it is to be noted that further rows of tooth segments arranged in the axial direction may be advantageous as well. For instance, in relation to scalability, it may be expected that the same system may double the transferable torque by doubling the rows of tooth segments. Hence, 1, 2 or 3 rows of tooth segments and even further rows of tooth segments are alternative embodiments within the scope of the present invention.

Further, it is to be noted that the gearbox with radial-moving-teeth design as shown herein may advantageously be combined with standard gearboxes used in wind turbines. For instance, combining one radial-moving-teeth design stage with one parallel stage, or with two parallel gear stages. Even combinations with planetary stages may be used if desired.

Figure 8:
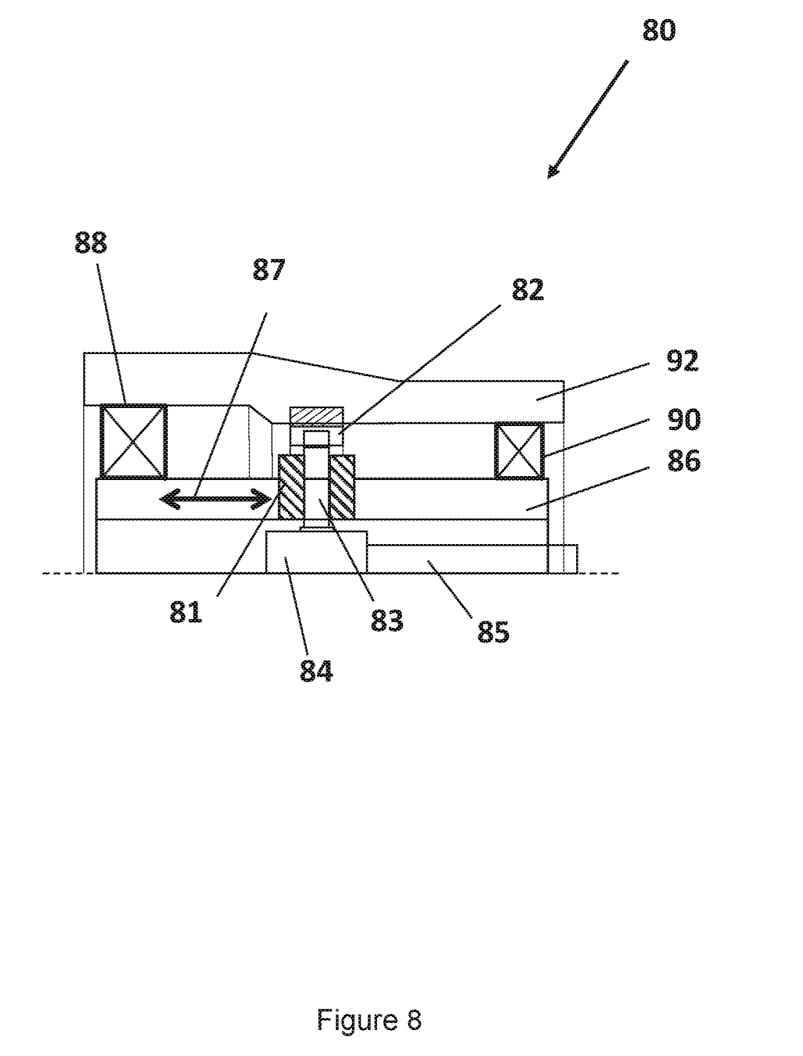
FIG. 8 shows an alternative embodiment of the present invention.

FIG. 8 discloses an alternative embodiment, making the wind turbine power transmission system even more compact than in FIG. 4. Here instead the new gearbox is integrated fully into the main shaft/bearing housing.

Similarly to FIG. 3, the power transmission system 80 includes first and second bearings 88, 90 supporting the main shaft 86, and a bearing housing 92 surrounding the first and second bearings 88, 90. In this embodiment, the gearbox is integrated into the power transmission system, such that the main shaft 86 is directly fixed to and rotates with the tooth carrier 81 inside the bearing housing 92. The gearbox works similarly to the principles as described above with a ring gear 82 fixed to or integrated with the bearing housing 92, radially moving tooth segments 83, thereby increasing the rotational speed of the output shaft eccentric section 84 compared to the rotational speed of the main shaft. This eccentric section 84 is coupled to or integrated with the output shaft 85, which is then further be coupled to a generator (not shown). Further, bearings (not shown) for the output shaft 85 will be present, for instance between the output shaft 85 and the main shaft 86.

The ring gear 82 is designed as an integral part of the bearing housing 92, the necessary toothing being machined into the bearing housing 92. Alternatively, the ring gear 82 may be flanged or bolted into the bearing housing 92 as a separate part, for instance by including machined grooves in the bearing housing 92 to accept the ring gear 82. Connections via semi-elastic elements to equalize deflections and/or dampen noise may also be possible.

The tooth carrier 81 may be designed as an integral part of the main shaft 86. The bores for the tooth segments 83 can be radially machined into the main shaft 86. It is as well possible to have the tooth carrier 81 as a separate part and connect it in between two parts of the main shaft 86.

The axial position of the gear system 25 in the bearing housing may be set based on desire. Dependent on the size of the system and other parameters, the ideal axial position may change, and can be adjusted accordingly as shown, 87. In one embodiment, the position of the gear system 25 is between 30% and 70% of the distance between the first and second bearings 88, 90. In other embodiments, the position of the gear system 25 is less than 25% of the distance between the first and second bearings 88, 90 from either of them.

The embodiments described above are merely examples of the invention defined by the claims that appear below. Those skilled in the design of wind turbines will appreciate additional examples, modifications, and advantages based on the description. In light of the above, the details of any particular embodiment should not be seen to necessarily limit the scope of the claims below.

The invention claimed is:

1. A wind turbine, comprising:
   a nacelle provided on the top of a tower;
   a rotor including a hub and a number of blades,
   a main shaft configured to be driven by the rotor about a main axis and supported on the nacelle,
   a generator having a generator rotor and generator stator, and
   a gear system arranged to increase the rotational speed between said rotor and said generator rotor;
   wherein the gear system comprises:
     a fixed ring gear,
     an input member coupled to or driven by the main shaft having a plurality of radially movable tooth segments carried in guiding slots and engageable at outer ends with the ring gear, and
     a central output member within the input member having an outer eccentric profile acted on and driven by inner ends of radially movable tooth segments, whereby rotary movement of the input member drives the radially movable tooth segments through engagement with the ring gear and effects rotation of the central output member.

2. The wind turbine according to claim 1, wherein said input member is an annular input member.

3. The wind turbine according to claim 1, wherein each radially movable tooth segment is connected to a tilting pad through a flexible connection, said tilting pad being adapted for sliding along said output member.

4. The wind turbine according to claim 1, wherein the output member is generally circular in cross-section with at least one eccentricity.

5. The wind turbine according to claim 1, wherein said output member is coupled to at least one further gear stage.

6. The wind turbine according to claim 1, wherein the gear system exhibits backlash between a non-loaded flank and a rear flank of the ring gear.

7. The wind turbine according to claim 1, wherein said gear system has a speed-increasing transmission ratio between i=10 and i=150.

8. The wind turbine according to claim 1, wherein said gear system has a number of radially movable tooth segments between 10 and 200.

9. The wind turbine according to claim 1, wherein said gear system has at least two rows of radially movable tooth segments.

10. The wind turbine according to claim 1, wherein said gear system has at least one row of radially movable tooth segments, and wherein the number of radially movable tooth segments per row is between 12 and 60.

11. The wind turbine according to claim 1, wherein the diameter of said ring gear is between 1000 mm and 3500 mm.

12. The wind turbine according to claim 1, wherein said movable tooth segments are cylindrical with a diameter of between 10 and 20 cm, and with a length between 20 and 50 cm.

13. The wind turbine according to claim 1, wherein an outer tooth flank contour of a tooth flank of the tooth segments and/or a flank contour of a toothing of an internal toothing of said ring gear have/has, in relation to a gear set axis (M), a tooth contour which makes surface contact possible in an engagement region, wherein the surface contact is achieved by the design as a logarithmic spiral.

14. The wind turbine according to claim 13, wherein, regardless of a selected radius of the gear set axis (M), the outer tooth flank contour of the flank region of the tooth segment and the flank contour of the internal toothing system of the toothing system of the ring gear correspond to a common logarithmic spiral (Ln) with a pitch angle (a).

15. The wind turbine according to claim 14, wherein the pitch angle (a) is between 15° and 75°.

16. The wind turbine according to claim 1, wherein a coating is used in at least one of the following interfaces: tooth segment to ring gear, tooth segment to input member, and tilting pad to output member.

17. The wind turbine according to claim 1, wherein said wind turbine has a nominal power of at least 2 MW, such as at least 4 MW.

18. The wind turbine according to claim 1, further comprising:
   a support structure including at least one bearing supporting the main shaft for rotation about the main axis and constraining other movements; wherein said gear system has a gearbox housing rigidly coupled to the support structure.

19. The wind turbine according to claim 18, wherein the support structure further includes a bearing housing surrounding the at least one bearing, the gearbox housing being suspended from said bearing housing.

20. The wind turbine according to claim 19, wherein the at least one bearing comprises a first bearing and a second bearing spaced apart within the bearing housing.

21. The wind turbine according to claim 19, wherein said ring gear is integrated with or rigidly coupled to said bearing housing and said input member is integrated with or rigidly coupled to said main shaft.

22. The wind turbine according to claim 20, wherein said gear system is fully integrated within said bearing housing such that said ring gear, along the rotational axis of the main shaft, is positioned between said first bearing and said second bearing.

\* \* \* \* \*

UNITED STATES PATENT AND TRADEMARK OFFICE
CERTIFICATE OF CORRECTION

PATENT NO. : 12,025,093 B2
APPLICATION NO. : 18/029978
DATED : July 2, 2024
INVENTOR(S) : Andreas Weber It is certified that error appears in the above-identified patent and that said Letters Patent is hereby corrected as shown below:

In the Claims

Claim 14, Column 11, Line 47, change "angle (a)" to -- angle (α) --.

Claim 15, Column 10, Line 49, change "angle (a)" to -- angle (α) --.

Claim 17, Column 10, Lines 55-56, change "at least 2MW, such as at least 4 MW" to -- at least 2 MW. --.

Signed and Sealed this
First Day of October, 2024

Katherine Kelly Vidal
*Director of the United States Patent and Trademark Office*